US006190454B1

(12) United States Patent
Anderson

(10) Patent No.: US 6,190,454 B1
(45) **Date of Patent: *Feb. 20, 2001**

(54) PRINTER CARTRIDGE

(76) Inventor: Dean Robert Gary Anderson, 1741 N. High Country Dr., Orem, UT (US) 84097

(*) Notice: Under 35 U.S.C. 154(b), the term of this patent shall be extended for 0 days.

This patent is subject to a terminal disclaimer.

(21) Appl. No.: 09/186,220

(22) Filed: Nov. 4, 1998

Related U.S. Application Data

(63) Continuation-in-part of application No. 08/958,292, filed on Oct. 27, 1997, now Pat. No. 5,944,893, which is a continuation-in-part of application No. 08/878,650, filed on Jun. 19, 1997, now Pat. No. 5,972,111.

(51) Int. Cl.$^{7}$ ................................ B05C 5/02; B05C 1/00; B41J 2/215; B05D 5/00; G11B 9/00

(52) U.S. Cl. .......................... 118/300; 118/239; 118/313; 427/124; 346/74; 346/140; 347/32; 347/86; 347/21

(58) Field of Search .................................... 118/239, 300, 118/313, 62, 63, 64, 65, 67, 410; 427/349, 124; 347/32, 86, 420, 26, 37, 21, 40, 42, 43, 44, 162, 108; 346/140, 74, 464

(56) References Cited

U.S. PATENT DOCUMENTS

| | | | |
|---|---|---|---|
| 1,277,632 | 9/1918 | Mizener . | |
| 2,248,713 | 7/1941 | Locke . | |
| 2,346,186 | 4/1944 | Poesl . | |
| 3,082,119 | 3/1963 | Harris . | |
| 3,779,206 | 12/1973 | Sato et al. | 118/63 |
| 3,805,737 | 4/1974 | Miller et al. | 118/102 |
| 3,977,842 | 8/1976 | Mayhew | 29/196.5 |
| 4,128,668 | 12/1978 | Ernest | 427/349 |
| 4,294,408 | 10/1981 | Snyder et al. | 239/218.5 |
| 4,314,263 | 2/1982 | Carley | 346/140 R |
| 4,324,366 | 4/1982 | Geier et al. | 239/533.1 |
| 4,387,124 | 6/1983 | Pipkin | 427/356 |
| 4,489,758 | 12/1984 | Malarz et al. | 137/881 |
| 4,527,712 | 7/1985 | Cobbs, Jr. et al. | 221/1 |
| 4,528,935 | 7/1985 | Patil et al. | 118/63 |
| 4,585,148 | 4/1986 | Ito | 101/350 |
| 4,590,857 | 5/1986 | Dahlgren | 222/77 |
| 4,648,267 | 3/1987 | Seegmiller | 73/147 |

(List continued on next page.)

OTHER PUBLICATIONS

NUR Advanced Technologies advertisement for Blueboard™ in *Digital Graphic Magazine*, May/Jun. 1997, p. 69.

Paasche AB (Fine Art) Airbrush instructions, reprinted courtesy of *Airbrush Digest*, 1983.

*Primary Examiner*—Richard Crispino
*Assistant Examiner*—J. A. Lorengo
(74) *Attorney, Agent, or Firm*—Morriss, Bateman, O'Bryant & Compagni

(57) ABSTRACT

A cartridge for use with a printing apparatus of the type typically employed for digital printing in which a painting material is deposited in metered amounts on a print medium comprises a housing containing a drive wheel, a first idler disposed in a paint reservoir, a wire disposed around the wheel and the idler, and an air nozzle having at least one nozzle orifice therein for directing a jet of air toward said wire. As the drive wheel is rotated, as with an external drive mechanism, paint contained within the paint reservoir coats the wire and is drawn by the wire in the path of the air jet. The air jet removes at least a portion of the paint from the wire and deposits the paint onto a print medium. By employing a plurality of such cartridges into a single print head, each containing a different color of paint, a color image can be painted onto a print medium.

48 Claims, 12 Drawing Sheets

U.S. PATENT DOCUMENTS

| | | | | |
|---|---|---|---|---|
| 4,720,801 | | 1/1988 | Boll | 364/510 |
| 4,723,712 | | 2/1988 | Egli et al. | 239/307 |
| 4,731,621 | | 3/1988 | Hayamizu et al. | 346/140 R |
| 4,750,009 | | 6/1988 | Yoshimura | 346/140 R |
| 4,764,780 | | 8/1988 | Yamamori et al. | 346/140 R |
| 4,778,642 | | 10/1988 | Lee et al. | 264/510 |
| 4,913,050 | | 4/1990 | Beaver et al. | 101/348 |
| 4,957,782 | | 9/1990 | Medler | 427/421 |
| 5,017,407 | | 5/1991 | Robertson | 427/349 |
| 5,076,767 | | 12/1991 | Desaulniers et al. | 417/426 |
| 5,077,653 | | 12/1991 | Barlet | 364/167.01 |
| 5,121,143 | | 6/1992 | Hayamizu | 346/140 R |
| 5,389,148 | | 2/1995 | Matsunaga | 118/300 |
| 5,511,695 | | 4/1996 | Chia et al. | 222/43 |
| 5,598,973 | | 2/1997 | Weston | 239/75 |
| 5,944,893 | * | 8/1999 | Anderson | 118/300 |
| 5,972,111 | * | 10/1999 | Anderson | 118/300 |

* cited by examiner

PRINTER CARTRIDGE

This application is a continuation-in-part of U.S. patent application Ser. No. 08/958,292, filed Oct. 27, 1997, now U.S. Pat. No. 5,944,893, which is a continuation-in-part of U.S. patent application Ser. No. 08/878,650 filed Jun. 19, 1997, now U.S. Pat. No. 5,972,111.

BACKGROUND

1. Field of the Invention

This invention relates generally to an apparatus used for digital painting or printing and, more specifically, to an apparatus that employs a metering device for metering a quantity of paint to be deposited on a surface to be painted or printed and that deposits the metered quantity of paint or other pigmented liquid material on the surface.

2. Background of the Invention

As computer technology has advanced, the ability to view high resolution graphics on a computer monitor or other visual display device has improved, and the capacity to reproduce these high resolution graphics onto a tangible medium has improved in both resolution, quality, and speed. One of the more significant and lucrative color printer technologies to be developed in recent years is the ink jet printer, which mixes several colors, typically cyan, magenta, yellow, and black, on the print medium (e.g., paper) to form a color image. Conventional ink jet printing heads include a plurality of nozzles and thermal elements. Ink is expelled from the nozzles in a jet by bubble pressure created by heating the ink with the thermal elements while the nozzles and thermal elements are in close proximity. One such ink jet printing head, as described in U.S. Pat. No. 5,121,143 to Hayamizu, includes a thermal head member having at least one thermal element consisting of a plurality of thermal dot elements and a plurality of electrodes of different widths connected to each thermal element whereby different widths of heated portions of the thermal element are obtainable to vary the amount of ink jetted in one dot. Another such ink jet printing head is described in U.S. Pat. No. 4,731,621 to Hayamizu et al.

Another type of print head is disclosed in U.S. Pat. No. 4,764,780 to Yamamori et al. in which an ink ejection recording apparatus includes a plurality of ink ejection heads connected to an ink tank. Each of the ink ejection heads have an ink nozzle through which minute ink droplets are discharged in accordance with an electric signal. An air nozzle opposing the ink nozzle and adapted for forming an air stream accelerates the ink droplets toward a recording medium.

A conventional airbrush is manufactured by the Paasche Airbrush Co. in Harwood Heights, Ill. The airbrush employs a reciprocating needle that retrieves paint from a reservoir and exposes the paint on the needle to a jet of air. The paint is blown from the needle and onto a print medium. Metering of the paint, however, is manually controlled by pressing a finger lever to allow air to flow through the airbrush.

Typical desk top ink jet printers for home or office use are relatively inexpensive but are usually limited to printing on standard office size sheets of paper, such as 8 ½×11 or similar standard sizes. Printers that can accommodate larger formats such as poster-sized sheets, however, are currently thousands of dollars to purchase. Printing machines that can print billboard-sized sheets are typically tens of thousands of dollars to purchase.

Some wide format printers are able to accommodate 16 feet or wider substrates, such as films, paper, vinyl, and the like, and can print 300 $ft^2$ per hour, depending on the resolution of the print. Such machines sometimes employ piezo print head technology that employs several print heads per color with numerous nozzles per print head to deposit ink onto the print medium. Another approach is to employ air brush technology in which inks are metered by valves and/or pumps and deposited onto the substrate. The quantity of ink pumped for each color and the position at which it is deposited on the print medium is typically computer controlled. The print medium is typically provided on a roll in which unmarked medium is fed under the print head and printed medium is rerolled once the ink has had sufficient time to dry. Large format printers using air brush technology typically have a resolution of up to 70 dpi.

In addition to the cost of the machine itself, which employs relatively small orifices, valves and nozzles for depositing the desired quantity and color of ink on the print medium (e.g., paper), expensive fine grade inks are used in which particle sizes within the inks are kept to a minimum to help keep the orifices, valves, and nozzles of the ink system from becoming clogged. Such inks are not very cost effective for painting or printing billboard sized images. Despite the high quality and expense of ink products, clogging of the print head is still a problem in current printer technologies.

Many large format printers also use water-based inks that may not be suitable for outdoor use. Accordingly, special waterproofing systems and techniques must be employed, such as treating the printing medium with a substance that binds with the ink once deposited to form a waterproof mark or laminating the print with a weatherproof film. These weatherproofing techniques and processes add expense to the cost of each print.

In some of the above-referenced printer technologies, replaceable cirtridges are typically employed to provide the various colors of ink for printing. Such cartridges generally include one or more reservoirs each containing a particular color of ink to be selectively and controllably applied to the print medium. In some cases, a print head is provided in the cartridge such that when replacing the cartridge with a new one, such as when the cartridge runs out of ink, a new print head is also provided. Often, however, such cartridges must be replaced, not because the ink they contain has been completely depleted, but because the print head has become plugged or clogged such that the performance of the cartridge has been significantly reduced.

Thus, it would be advantageous to provide a replaceable printer cartridge employed in a digital printer that does not include orifices and/or nozzles through which the ink or paint must flow and, thus, is not limited by paint particle size or large particle contamination and is relatively insensitive to the physical properties of the paint. It would also be advantageous to provide a printer cartridge that can utilize paints and inks already designed for the sign and art industries and that can be employed to digitally print on large format media.

SUMMARY OF THE INVENTION

It is an object of the present invention to provide a printer cartridge that can print with many forms of liquid printing materials such as paints and inks.

It is another object of the present invention to provide a printer cartridge that is relatively simple in construction and relatively inexpensive to manufacture.

It is yet another object of the present invention to provide a printer cartridge that can be removed and stored in a cool environment to substantially reduce oxidation.

It is still another object ov the present invention to provide a printer cartridge that may be removed and cleaned and/or stored in a solvent bath.

It is another object of the present invention to provide a printer cartridge in which the liquid printing material is metered through computer control.

It is still another object of the present invention to provide a plurality of printer cartridge injectors in a single print head, each printer cartridge containing a different color, and employing the print head to create a digital image on a print medium.

Accordingly, a printer cartridge is provided comprising an air nozzle that directs one or more jets of air across a moving member, the member having ink, paint, or other similarly pigmented liquid material disposed thereon. The air pulls the paint from the member and directs it onto a print medium, such as paper, vinyl, film, or other print media known in the art. Preferably, the member is an elongated segment of material that is advanced in front of the air jet or jets by at least one wheel around which the segment is at least partially disposed. Thus, as the segment is advanced in front of the air jet or jets, paint thereon is blown off of the segment and onto the print medium.

In a preferred embodiment, a single wire strand is employed to bring ink or paint contained within a reservoir or from some other painting material source in proximity with an air stream where it is carried to a print medium. Advancement of the drive wheel controls the speed of the wire's advance through the air stream and thus meters the quantity of paint injected into the air jet. As the wire is advanced through the reservoir, a coating of paint clings to the wire, the thickness of the coating being controlled to a degree by the viscosity of the paint. In addition, a mechanical metering device, such as a scraper riding proximate to or in contact with the wire as it is advanced, may be employed to control the thickness or amount of paint on the wire before it enters the air stream. The wire, having a coating of paint thereon, is then drawn into close proximity to one or more jets of air. As the paint on the wire reaches the jet or jets of air, it is pulled or blown from the wire and into the air stream until it impacts the print medium. In order to keep the wire positioned in front of the air jet, a wire guide may be employed proximate to the air nozzle to prevent the wire from being forced away from the air jet and to reduce vibration of the wire in the air stream.

The wire is preferably drawn through the paint reservoir and thus coated with paint by being disposed at least partially around a pulley or wheel driven by an external drive mechanism. The wire is also at least partially disposed around a freely rotatable or stationary idler or guide that is at least partially immersed in paint or painting material. It may also be the case that the drive wheel be immersed in the painting material and the guide or idler be positioned outside of the painting material.

In yet another preferred embodiment, a plurality of cartridges are employed in a single print head, each preferably containing a different color of painting material. By controlling and coordinating the metering of the different colors of paint and the position of the print head, as with error diffusion, stochastic screening, or blue noise algorithms as known in the art, a digital image can be created on a print medium.

Preferably, the cartridge is replaceable and is designed to be attachable and removable from a printer. The cartridge is preferably comprised of a support structure such as a housing, a painting material reservoir associated with the housing containing a quantity of a painting material, a drive wheel rotatably mounted within the housing, a first idler rotatably mounted relative to the housing positioned within the painting material reservoir, a second idler rotatably mounted within the housing, and a wire disposed around the drive wheel and advanced thereby, around at least a portion of the first idler, and around at least a portion of the second idler.

In a preferred embodiment, the cartridge includes an air nozzle associated with the housing and oriented to direct an air jet at a portion of the wire for removing painting material disposed thereon and depositing the painting material onto a print medium. Preferably, the air nozzle comprises a nozzle body having a plurality of nozzle orifices therein. A first nozzle orifice is preferably positioned to direct an air jet proximate a left side of the wire, a second nozzle orifice is preferably positioned to direct an air jet proximate a right side of the wire, and a third nozzle orifice is preferably positioned to direct an air jet proximate the center of the wire causing a substantial amount of paint disposed on the wire to be removed by the air jets.

Preferably, the housing defines a first opening for exposing the air nozzle orifices and a second opening for providing access to the drive wheel for engagement with an external drive mechanism such as a printer configured for receiving such a cartridge.

In another preferred embodiment, the painting material reservoir is integrally formed with the housing.

In yet another preferred embodiment, the painting material reservoir is engageable with and removable from said housing.

In still another preferred embodiment, the first idler includes a mixing device associated therewith for stirring the painting material contained within the painting material reservoir.

Preferably, the drive wheel defines a first circumferential groove and a second circumferential groove, and the wire has a first end and a second end. The first end of the wire is preferably secured to the drive wheel proximate the first groove and the second end of the wire is preferably secured to the drive wheel proximate the second groove.

In still another preferred embodiment, the first idler is oriented to receive the wire from the first groove such that the wire is substantially aligned with a plane defined by the first groove. In addition, the first idler is oriented to direct the wire toward the second idler such that the wire is substantially aligned with a plane defined by the second groove of the drive wheel.

It is also preferable that tension be maintained in the wire as with a biasing member or device. For example, the second idler may be biased relative to the housing to maintain tension in the wire or the first idler may be biased relative to the drive wheel to maintain tension in the wire in which case the second idler may not be required.

The wire employed in accordance with the present invention may form a continuous loop or have discrete ends with a substantial portion of the wire wound within the first groove when the cartridge is in a state ready for applying printing material to a print medium.

In yet another preferred embodiment, a painting material filled pouch is provided within the painting material reservoir. The pouch includes means for selectively opening the pouch such as a pull string or other devices known in the art.

The cartridge in accordance with the present invention also preferably includes a plurality of scrapers and wire guides such as a scraper member in contact with at least a portion of the wire for removing at least some of the painting material from the wire. Likewise, a wire guide may be provided for maintaining the wire in position relative to the air nozzle.

In still another preferred embodiment, a rewind scraper is provided for removing a substantial amount of painting material from the wire prior to being wound upon the play out side of the drive wheel. Such a rewind scraper may comprise a length of string or other fibrous material tied around the wire such that when the rewind scraper abuts against a wire guide, the wire slides through the rewind scraper. Similarly, the rewind scraper may comprise a bead comprised of a material such as nylon or other materials known in the art through which the wire can slide, the bead removing a substantial amount of painting material from the wire prior to being rewound on the drive wheel.

The cartridge also preferably includes various alignment and securing features configured for removably securing the cartridge to a printer.

Finally, a cartridge in accordance with the present invention preferably comprises a single housing containing a plurality of painting material reservoirs, a plurality of air nozzles, a plurality of drive wheels, a plurality of first idlers, a plurality of second idlers, and a plurality of wires, each being disposed around one of the drive wheels, around at least a portion of one of the first idlers, and around at least a portion of one of the second idlers. Such a cartridge could be employed for multicolor printing with a single cartridge.

DETAILED DESCRIPTION OF THE PREFERRED EMBODIMENTS

Figure 1:
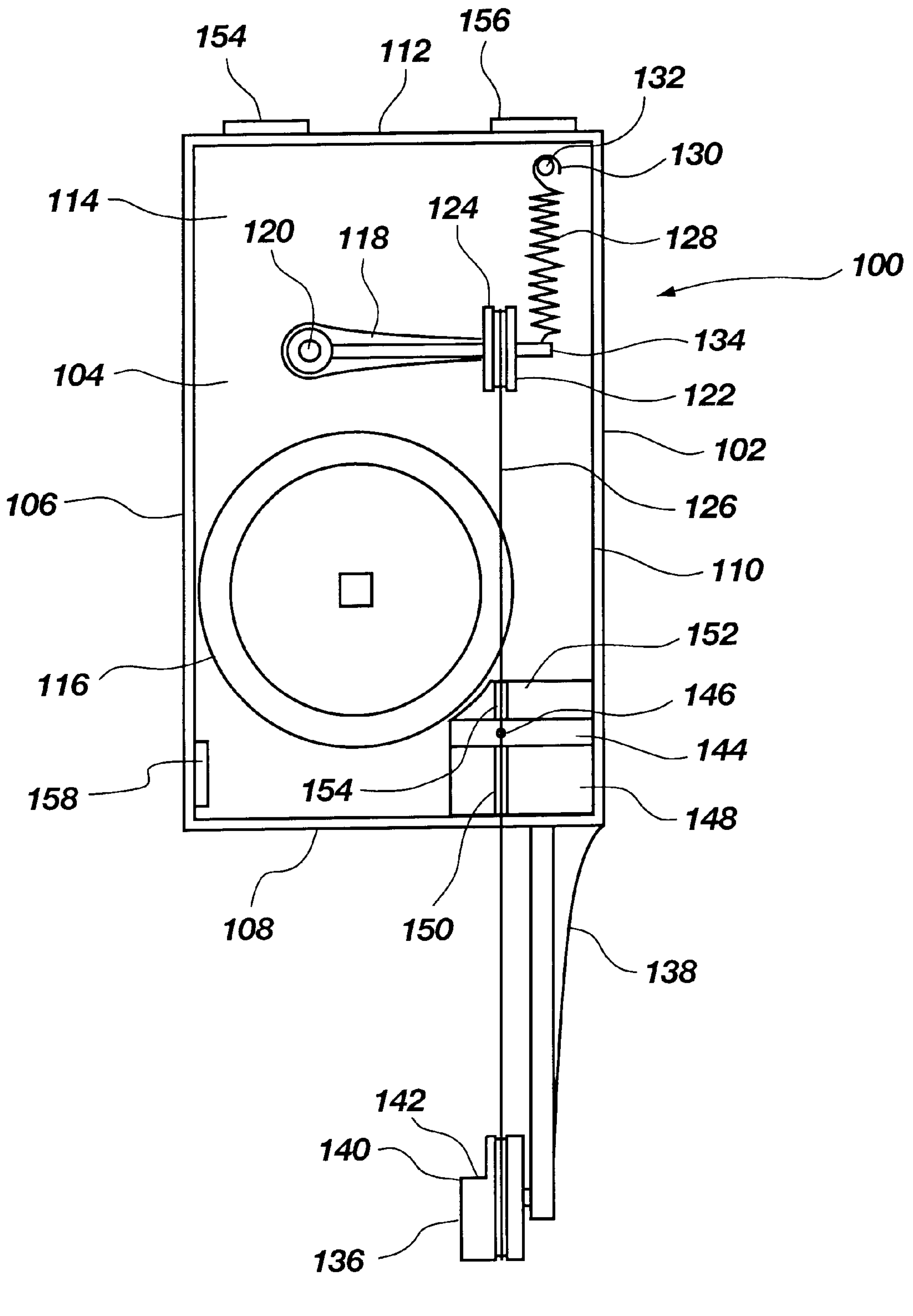
FIG. 1 is a schematic side view of a first preferred embodiment of a printer cartridge in accordance with principles of the present invention.

Reference will now be made to the drawings in which the various elements of the present invention will be given numerical designations and in which the invention will be discussed so as to enable one skilled in the art to make and use the invention. FIG. 1 illustrates a replaceable cartridge, generally indicated at 100, for use with a printing machine of the type disclosed in U.S. patent application Ser. No. 08/878,650 and U.S. patent application Ser. No. 08/958,292, each of which are incorporated herein by this reference. The cartridge 100 is comprised of a housing 102, preferably comprised of a plastic material or other materials known in the art. In this preferred embodiment, the housing 102 is comprised of a back plate 104 to which a plurality of walls 106, 108, 110, and 112 depend to form an interior chamber or compartment 114. Contained within the housing 102 is a main wire wheel 116 rotatably attached to the back plate 104. In addition, an arm 118 is pivotally attached to the back plate 104 as with an elongate pin 120 depending from the back plate 104 in a direction substantially perpendicular to a plane defined by the back plate 104. The cartridge 100 includes a first idler 136 and a second idler 122. A second idler 122 is rotatably attached to the arm 118. The second idler 122 defines a circumferential groove 124 for receiving a wire 126 therein. A biasing device 128 such as a coil spring, a resilient member, is secured proximate a first end 130 to the back plate 104 as with a pin 132 depending from the back plate 104 and secured proximate a second end 134 to the arm 118 for biasing the arm 118 and thus maintaining tension in the wire 126 with the idler 122.

As further illustrated, the wire 126 extends from the second idler 122 to a first idler 136 which is rotatably attached to an elongate arm 138 attached to and depending from the wall 108. The first idler 136 is provided with an irregular surface 140, in this case a transversely extending step 142 used for mixing the pigmented material to be applied as the idler 136 rotates. In addition, between the upper or second idler 122 and the lower or first idler 136 a nozzle body 144 is secured to the housing 102. The nozzle body 144 defines one or more ports or orifices 146 for directing a jet of fluid, such as air or other gaseous substances or a liquid such as a paint solvent, toward the wire 126. In addition, a wire wiper or scraper 148 defining a channel 150 therethrough is provided between the lower idler 136 and the orifice 146 such that excess liquified pigmented material, such as paint, ink or other materials known in the art to be applied using the cartridge 100, is removed from the wire 126 to provide a consistent layer or coating of such pigmented material on the wire 126 prior to being removed from the wire 126 with a jet of air emanating from the orifice 146. An upper wire guide 152 also defining an elongate channel 154 is provided above the orifice 146 to help maintain the wire 126 in position relative to the orifice 146 as the wire 126 is drawn past the orifice 146.

In order to provide for quick insertion and removal of the cartridge 100 to and from a printing machine, the cartridge 100 is provided with various alignment and securing features. For example, snap-in features 154 and 156 are attached to and depend from the wall 112 for grasping a cartridge receptacle (not shown) in the printing machine. Likewise, various internal features, such as an alignment slot 158 and 159 (see FIG. 2) is provided in the wall 106 for receiving an alignment feature (not shown) in a cartridge receptacle and thus securing the cartridge in proper position to the printing machine. After reviewing and understanding the present invention, those skilled in the art will appreciate that other alignment/securing features may be incorporated into the cartridge without departing from the spirit and scope of the present invention.

Figure 2:
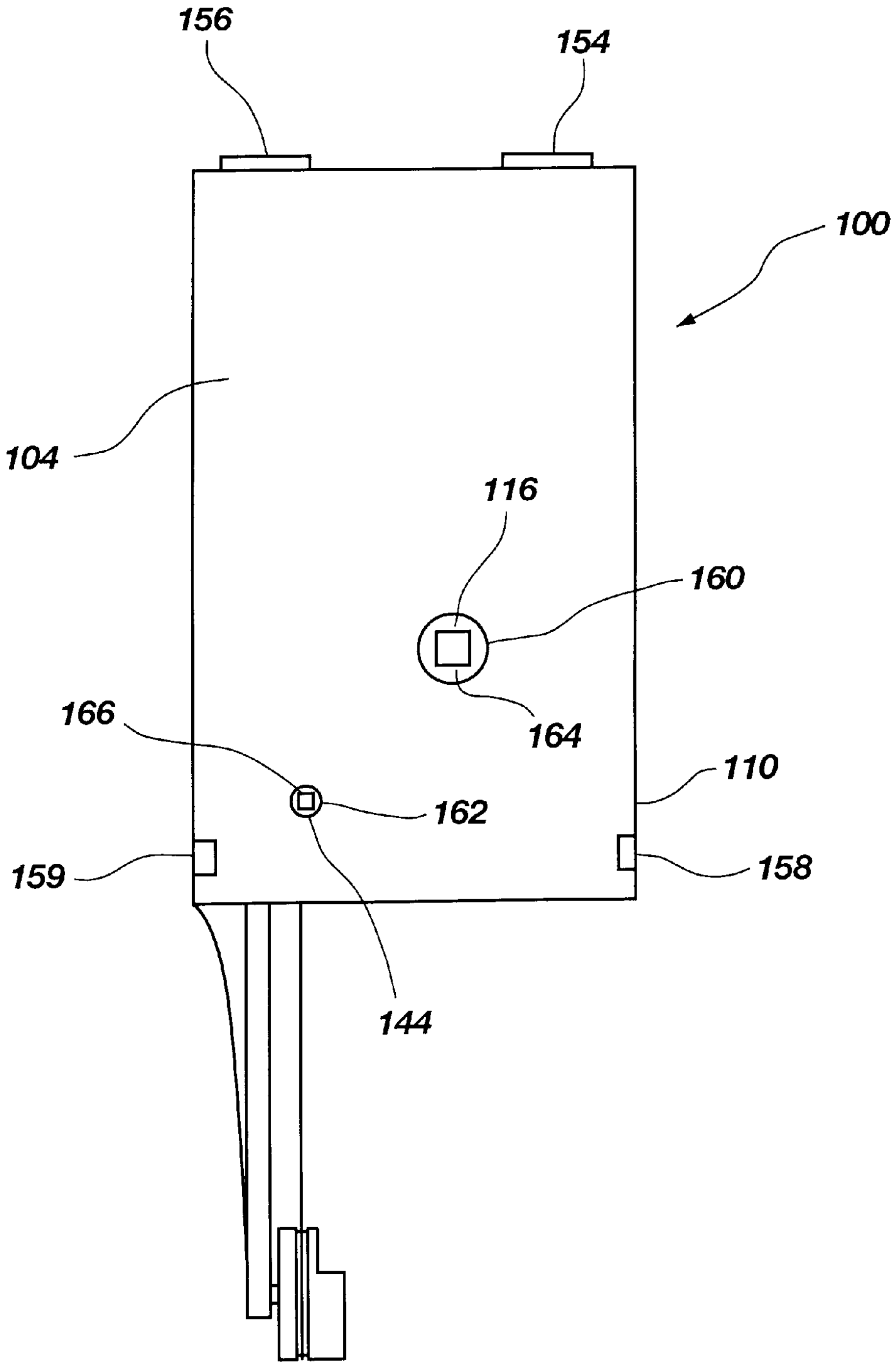
FIG. 2 is a schematic back view of the printer cartridge illustrated in FIG. 1.

Referring now to FIG. 2, the back plate is provided with a plurality of openings or apertures 160 and 162. In addition, the wheel 116 defines a bore 164 for receiving a shaft (not shown) which is attached to or linked to a motor (not shown) for selectively rotating the wheel 116. As shown, the bore 164 has a substantially square cross-section to mate in a male/female relationship with a square shaft of substantially the same size. Thus, rotation of such a shaft will cause rotation of the wheel 116 without slippage of the shaft relative to the bore 164 of the wheel 116. It is also contemplated that such a bore may have a hexagonal, octagonal, oval, or other cross-sectional shape that would substantially reduce the possibility of the bore 164 rotating relative to a drive shaft inserted therein.

As discussed, the back plate 104 also includes an aperture 162 for providing access to the nozzle body 144, and more specifically to an air manifold coupling 166 provided in the nozzle body 144. As such, when the cartridge is properly secured to a printing machine as with alignment features 154 and 156 and alignment slots 158 and 159 provided in the back plate 104 and walls 106 and 110, an fluid supply (not shown), such as a supply of air or solvent, or other gases and liquids known in the art, will be coupled to the fluid manifold coupling 166.

Figure 3:
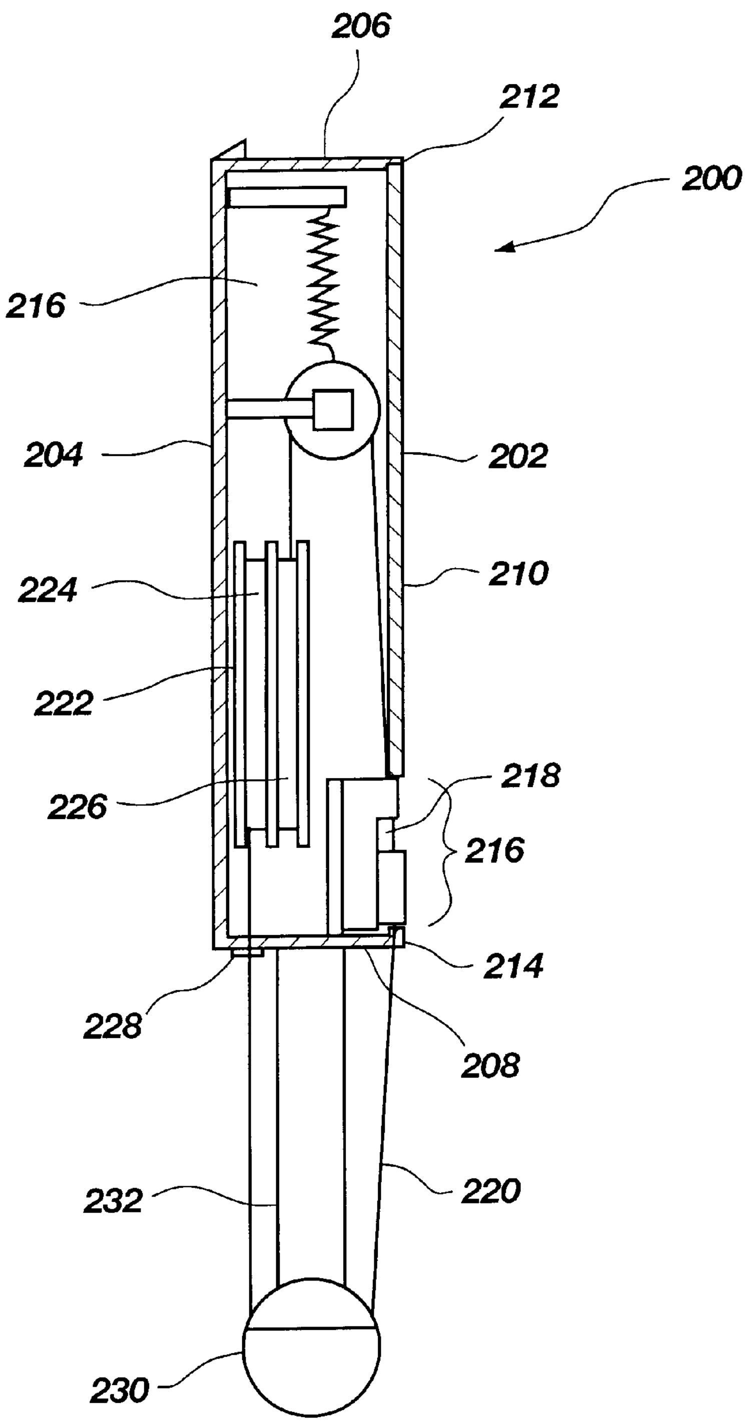
FIG. 3 is a schematic side view of a second preferred embodiment of a printer cartridge in accordance with principles of the present invention.

As further illustrated in FIG. 3, a cartridge 200 may be comprised of a housing 202 comprised of a back plate 204 with a plurality of side walls, such as walls 206 and 208, depending from a perimeter thereof and having a lid or cover 210 secured to the distal ends 212 and 214 of the plurality of walls, such as walls 206 and 208, respectively. Furthermore, the cover 210 defines an opening 216 for at least exposing the nozzle orifice 218 such that paint drawn by the wire 220 can be directed to a print medium without interference from the cover 210. As such, the back plate 204, side walls 206 and 208, and the cover 210 define a substantially enclosed chamber 216. Such a housing 202 may be desirable to help prevent debris or other contaminants from entering into and affecting the operation of the cartridge 200.

As shown in FIG. 3, prior to use of the cartridge 200, the wire 220 is wound upon a wheel 222 having a first circumferential groove 224 for winding unused wire thereon and a second circumferential groove 226 for winding used wire thereon. While the reference to used wire and unused wire is employed, the use of the terms unused wire is intended to mean wire that is in position to be drawn through a liquid painting material and used wire is intended to mean wire that has been drawn in front of the nozzle orifice 218. The wheel is connected to a stepper motor (not shown) or other drive means which can selectively and controllably rotate the wheel 222 such that the wire 220 and thus a metered amount of liquid painting material is drawn in front of the nozzle orifice 218. The used wire 220 is then wound upon the wheel 222 in groove 226. After a predetermined amount of wire 220 has been wound in the groove 226 as determined by the amount of rotation of the wheel 222 or after each line of printing performed by the cartridge 200, the wheel 222 is counter rotated to rewind the wire 220 into the groove 224 for further printing. During such rewind operation, a wiper member 228 which may be comprised of a segment of an absorbent material such as a cotton string tied around the wire 220 to wipe liquid painting material from the wire 220 prior to being wound onto the wheel 222 in the groove 224. The painting material (not shown) is preferably provided in a reservoir, such as a container having an opening in the top thereof for receiving the lower idler 230, a portion of the wire 220 and a portion of the elongate member 232 to which the lower idler 230 is rotatably attached. Likewise, the painting material could be drip fed, brushed on, or otherwise applied to the wire 220 as may be conceived by those skilled in the art after reviewing the principles of the present invention.

Figure 4:
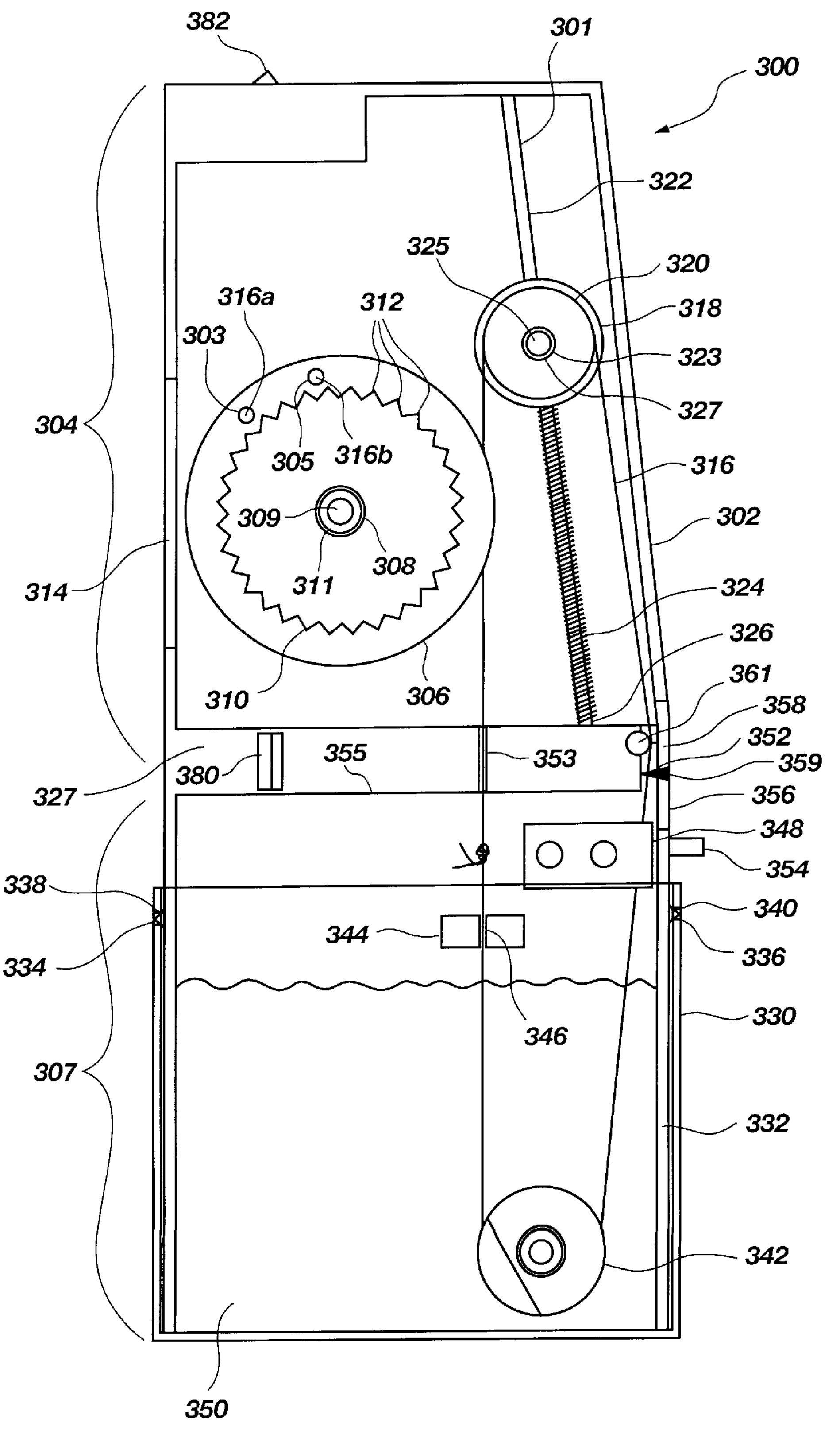
FIG. 4 is a schematic side view of a third preferred embodiment of a printer cartridge in accordance with principles of the present invention.

FIG. 4 illustrates yet another preferred embodiment of a printer cartridge, generally indicated at 300 in accordance with the present invention. The cartridge 300 comprises a housing 302 having an upper portion 304 and a lower portion 307. The upper portion 304 houses a main wire wheel 306 which provides both a wire take-up function and a wire play-out function. The wheel 306 is rotatably attached to the housing 302 as with a hub 308. The hub 308 is preferably comprised of an axle 309 comprised of a pin secured to the housing 302. The pin may be received into a receiving socket in the other side of the housing 302 to provide stability. A relatively thin wall tube 311, preferably comprised of stainless steel, is interposed between the axle 309 and the wheel 306 to form a bearing between the wheel 306 and the axle 309. It is also contemplated that stainless steel shim discs may be used as thrust bearings. In addition, the wheel 306 is provided with a means for rotating the wheel 306 which in this embodiment comprises a gear 310 having a plurality of circumscribing teeth 312 thereon for engaging with a drive gear (not shown) of the printer (not shown). It is also contemplated that other drive means may be employed such as belt/pulley arrangements, frictional engagement of wheels, and the like. The housing 302 is provided with an opening 314 therein for insertion of a drive gear when the cartridge 300 is properly seated within a printer. As such the gear 310 and thus the wheel 306 can be selectively and controllably rotated to control relatively precise movement of the a wire 316 secured to the wheel 306. Moreover, as specifically shown in FIG. 6, a drive motor or drive mechanism 390 could be incorporated into the cartridge 300 such that the cartridge 300 is self driven. Such a motor may be electrical or pneumatically driven. In the case of an electric motor, electrical contacts 391 and 392 may be provided on the housing 302 or on the motor 390 for selectively providing power to the motor 390 and thus selectively driving the wheel 306. In the case of a pneumatic motor 390, the same air supply provided to the nozzle 352 may provide air to drive the motor 390.

The wheel 306 is provided with holes 303 and 305 (see also FIG. 6) such that the ends of the wire 316 can be secured to the drive wheel 306 as with an interference fit by inserting the ends 316*a* and 316*b* of the wire 316 into the holes 303 and 305 and/or pressing pins (not shown) into the holes 303 and 305. Of course, other means of securing the ends 316*a* and 316*b* of the wire 316 may be employed to secure the wire 316 relative to the wheel 306.

Also provided in the upper portion 304 is an upper idler 318 preferably comprised of a relatively freely rotating wheel having a circumscribing channel or groove 320 for receiving and guiding the wire 316. The idler 318 is rotatably secured to a guide such as an elongate rod 322 so that the idler 318 can translate along a length of the rod 322. It is also contemplated that a slot, rail, or other similar structure may be employed to guide the idler 318 and allow the idler to translate relative to the housing 302 to maintain substantially constant tension on the wire 316. Similar to the mounting of the wheel 306, the idler 318 is rotatably attached to the elongate rod 322 as with a hub 323. The hub 323 is preferably comprised of an axle 325 and a relatively thin wall tube 327, preferably comprised of stainless steel, interposed between the axle 325 and the idler 318 to form a bearing between the idler 318 and the axle 325. The idler 318 is retained on the axle by thermally meting the end 331 of the axle 325 (see FIG. 5). A biasing member 324 such as a coil spring is provided along the rod 322 between the upper idler 318 and the point 326 on a housing cross-member 327 where the rod 322 is attached to the housing 302. The rod 322 is also attached at a first end 301 thereof to the housing 302. The biasing member 324 biases the idler 318 away from the point 326 such that tension is applied to the wire 316. In addition, the idler 138 could ride along a rigid slot or rail or other such device known in the art to allow the idler 318 to translate relative to the housing 302.

The lower portion 307 of the cartridge 300 is generally comprised of reservoir receiving portion 332 depending from the cross-member 327 for receiving and securing thereto a container or painting material reservoir 330. The reservoir receiving portion 332 is provided with external protrusions, such as protrusions 334 and 336 for mating with indentations or recesses 338 and 340, respectively, provided in the reservoir 330. A lower idler 342 is rotatably secured relative to the reservoir receiving portion 332. The idler 342 is preferably secured to the reservoir receiving portion in a manner similar to that described with reference to the wheel 306. A wire guide/rewind scraper 344 having a transversely extending channel 346 therethrough for receiving the wire 316 is secured to the reservoir receiving portion 332. Likewise, a scraper 348 is secured to the reservoir receiving portion 332, as with thermoplastic welds 333, to provide a substantially even coating or layer of painting material 350 to the wire 316 prior to being drawn in front of the air nozzle 352. During the rewind procedure, a secondary wiper 351 is secured to the wire 316 at a position between a transverse bore or slot 353 provided in the cross-member 327 and the scraper 344. The bore or slot 353 is not in fluid communication with the air nozzle 352. Such a secondary scraper 351 may comprise a segment of string or other fabric-like material tied to the wire 316 or a bead or plug comprised of a material such as nylon, plastic, or other materials known in the art through which the wire 316 is threaded which upon rewind abuts against the surface 355 of the cross-member 327 and substantially wipes the wire 316 such that the painting material 350 drips back into the reservoir 330 and during the painting operation abuts against the scraper 344.

As further illustrated in FIG. 4, a tab 354 is provided on the front face 356 of the housing 302 proximate the air nozzle 352 for controlling the distance between the cartridge 300 at the air nozzle 352 and the print media (not shown). Moreover, a window 358 is provided in the front face 356 of the housing 302 to allow painting material 350 and air jet 359 to escape from the cartridge 300. The cross member 327 includes the air nozzle 352 provided for removing the painting material 350 from the wire 316.

Figure 5:
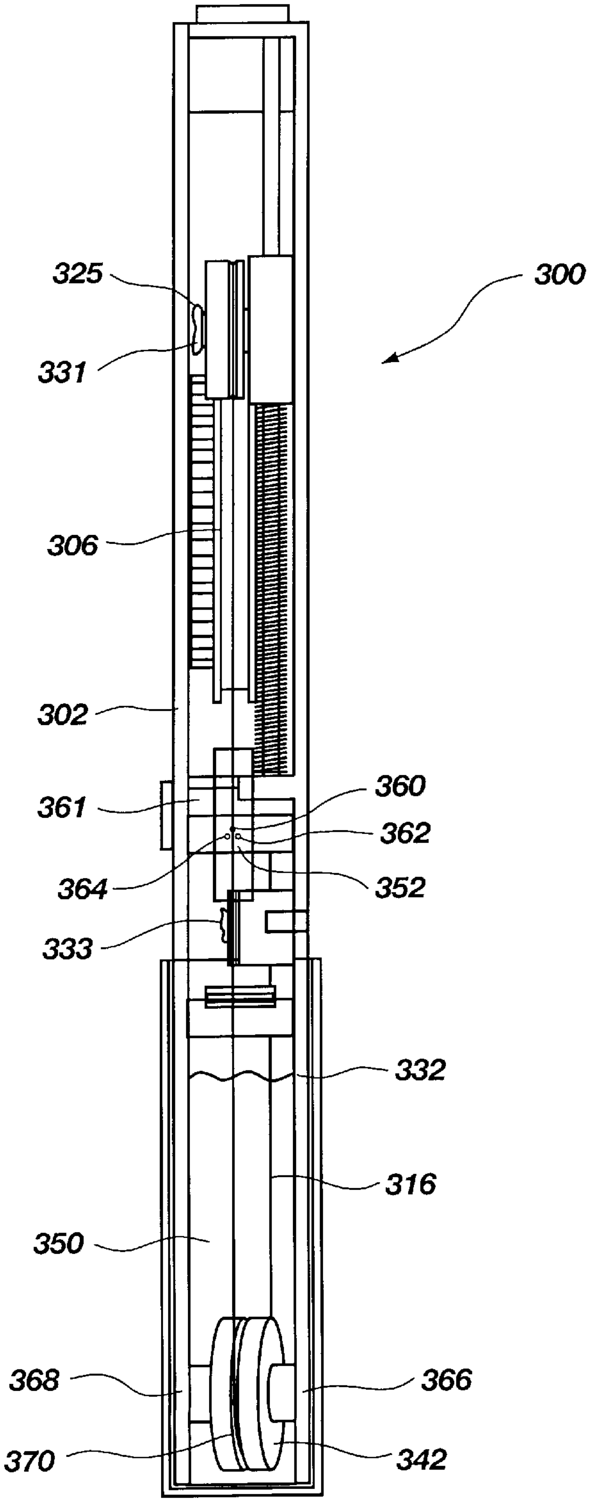
FIG. 5 is a schematic front view of the printer cartridge illustrated in FIG. 4.

Referring now to FIG. 5, the air nozzle 352 defines a plurality of nozzle orifices 360, 362 and 364. The nozzle orifices are arranged such that the orifices 362 and 364 are substantially horizontally aligned with one on each side of the wire 316 and orifice 360 in substantial alignment with the wire 316 when viewed from the direction shown in FIG. 5. The orifices 360, 362 and 364 are preferably of a size of approximately 0.020 inches and approximately 0.2 inches in depth. Moreover, it is preferably that the orifices 360, 362 and 364 be angled downwardly at approximately 5 degrees. While other configurations and numbers of air orifices may be employed in accordance with the principles of the present invention, the use of three orifices 360, 362, and 364 helps focus the paint jet onto the print media. Preferably, the two lower orifices 362 and 364 do not pull paint 350 from the wire 316. The third orifice 360 is provided to pull the paint 350 from the wire 316, and the paint 350 is then trapped or caged between the three jets of air emanating from the orifices 360, 362, and 364 resulting in a more collimated "atomized" paint stream. As shown in FIGS. 4 and 5, an externally threaded rod 361, preferably comprised of a metal or other abrasion resistant material, is secured as with thermoplastic welds relative to the housing 302 such that one of the threads positions and aligns the wire 316 substantially directly over the central orifice 360. Of course, other members having a channel therein for guiding the wire 316 may be employed.

Figure 6:
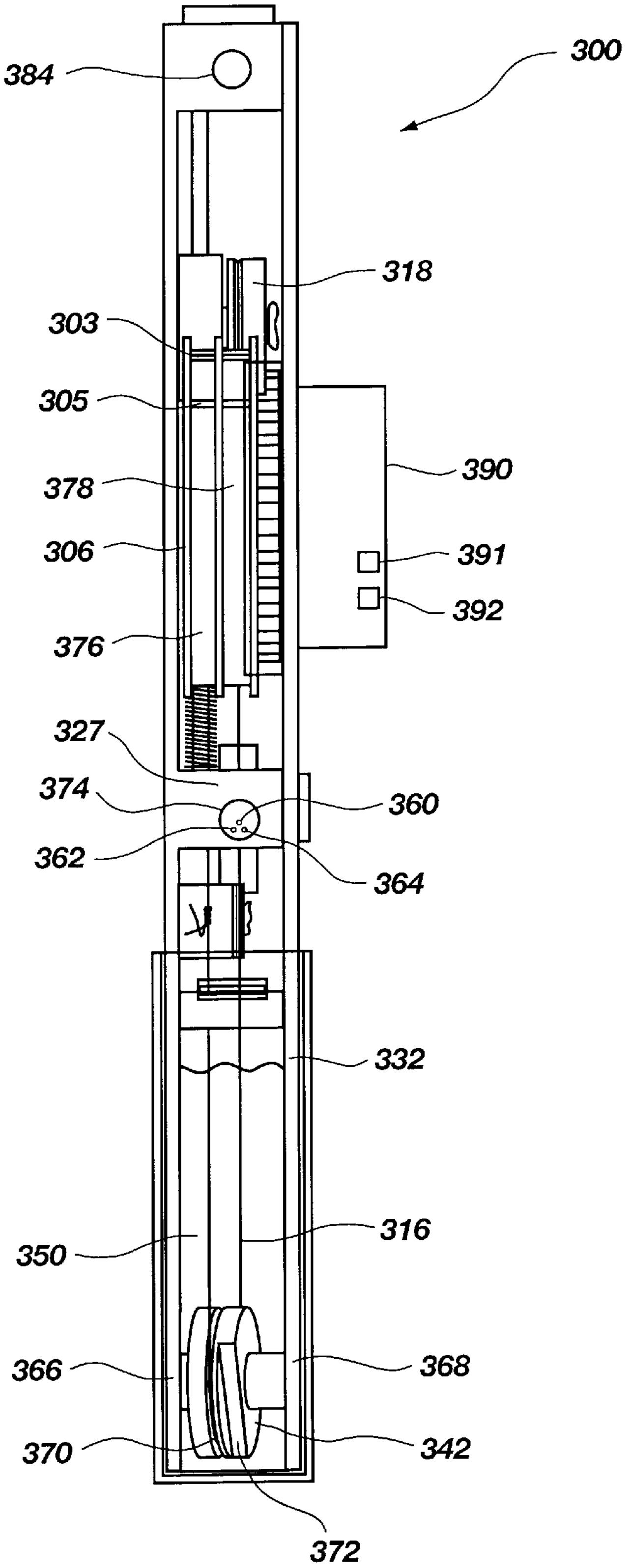
FIG. 6 is a schematic back view of the printer cartridge illustrated in FIG. 4.

As further illustrated in FIGS. 5 and 6, the lower idler 342 is rotatably secured between the side walls 366 and 368 of the reservoir receiving portion 332. The idler 342 is substantially free to rotate relative to the side walls 366 and 368 and is provided with a circumscribing groove or channel 370 for receiving the wire 316 therein. The idler 342 is also provided with a paddle 372, in this example, an irregular surface configuration, for mixing the painting material during the painting operation. The idler 342 is also oriented such that a plane defined by the groove 370 is at an angle relative to the plane defined by the wheel 306. As such, the wire 316 is fed from a feed groove 376 of the wheel to the idler 342 in a substantially vertical manner and between the idler 342 and the upper idler 318 in a substantially vertical manner as shown in FIG. 6. Maintaining the wire 316 in such a vertical orientation helps maintain the wire 316 near the center of the grooves 378 and 376 to minimize diameter growth of the wound wire thereby minimizing the required stroke length of the idler 318 along the shaft 322 and also to reduce wear of the various wire guides in directions transverse to slots or grooves formed therein.

In use, as shown in FIGS. 4, 5, and 6, a first end of the wire 316 is secured to the hole 303 or other wire retaining device and the wire 316 is wound many times in the groove 376. The wire travels through the wire guide 353, through the rewind scraper 351, and through the scraper/wire guide 344. The wire 316 passes around the lower idler 342 to be submerged in the painting material 350 and through the scraper 348. The painting material remaining on the wire 316 is pulled from the wire by the air jet 359. The used wire 316 then passes over the tensioning idler 318 and is secured in the hole 305 for being wound in the second groove 378 during the printing process. Preferably, the cartridge 300 contains enough wire 318 so that the entire width of the print medium can be continuously painted by the cartridge 300 without having to rewind the wire 318. In addition, it is preferable that after each pass or after a set number of passes of the cartridge 300 over the print medium, the wire 316 is rewound into groove 376. During the rewind process, the wire is transferred from the groove 378 to the groove 376. The wiper or rewind scraper 351 abuts against the cross member 327 and removes a substantial amount of painting material 350 therefrom prior to being rewound in the groove 376.

Figure 8:
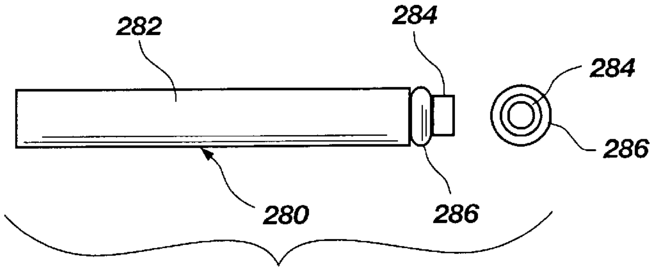
FIG. 8 is a schematic side view and front view of a preferred embodiment of a self sealing fluid supply in accordance with principles of the present invention.

As shown in FIG. 6, a longitudinally extending bore 374 is provided in the crossmember 327 in fluid communication with the nozzle orifices 360, 362 and 364 for receiving an air supply coupling such as a cylindrical tube-like member having an o-ring or other seal member circumscribing the tube-like member for being received in and sealed relative to the bore 374. Such a self sealing air supply 280 is illustrated in FIG. 8 in which the air supply 280 is comprised of an elongate hollow alignment pin 282 attached to an air supply (not shown). The proximal end 284 has a smaller diameter than the rest of the pin 282 to aid in alignment of a printer cartridge in accordance with the present invention to the pin 282 and includes an o-ring 286 disposed thereon for sealing the pin 282 to an air supply port of the cartridge.

The cartridge 300, as illustrated in FIGS. 4, 5, and 6 is provided with various alignment and securing features for properly orienting the cartridge 300 to a printing machine (not shown). For example, as shown in FIG. 4, retention tabs 380 and 382 are used for snap-in mounting of the cartridge 300 to a printer. Likewise, as shown in FIG. 6, alignment holes 384 and 374 are provided for proper vertical alignment of the cartridge 300 relative to the printer.

As such, once installed in a printer, the cartridge 300 with paint reservoir 330 attached can be selectively controlled to disperse paint material 350 therefrom onto a paint medium. When the level of paint 350 within the reservoir 332 gets to a point where the paint 350 no longer adequately coats the wire 316, the reservoir 332 can be removed and refilled with the appropriately colored paint 350 or replaced with a new paint reservoir containing a quantity of the desired paint 350. Moreover, after extended use, the wire 316 may wear thin and break. In such a case, it would be desirable to replace the entire cartridge 300 with a new one.

Figure 7:
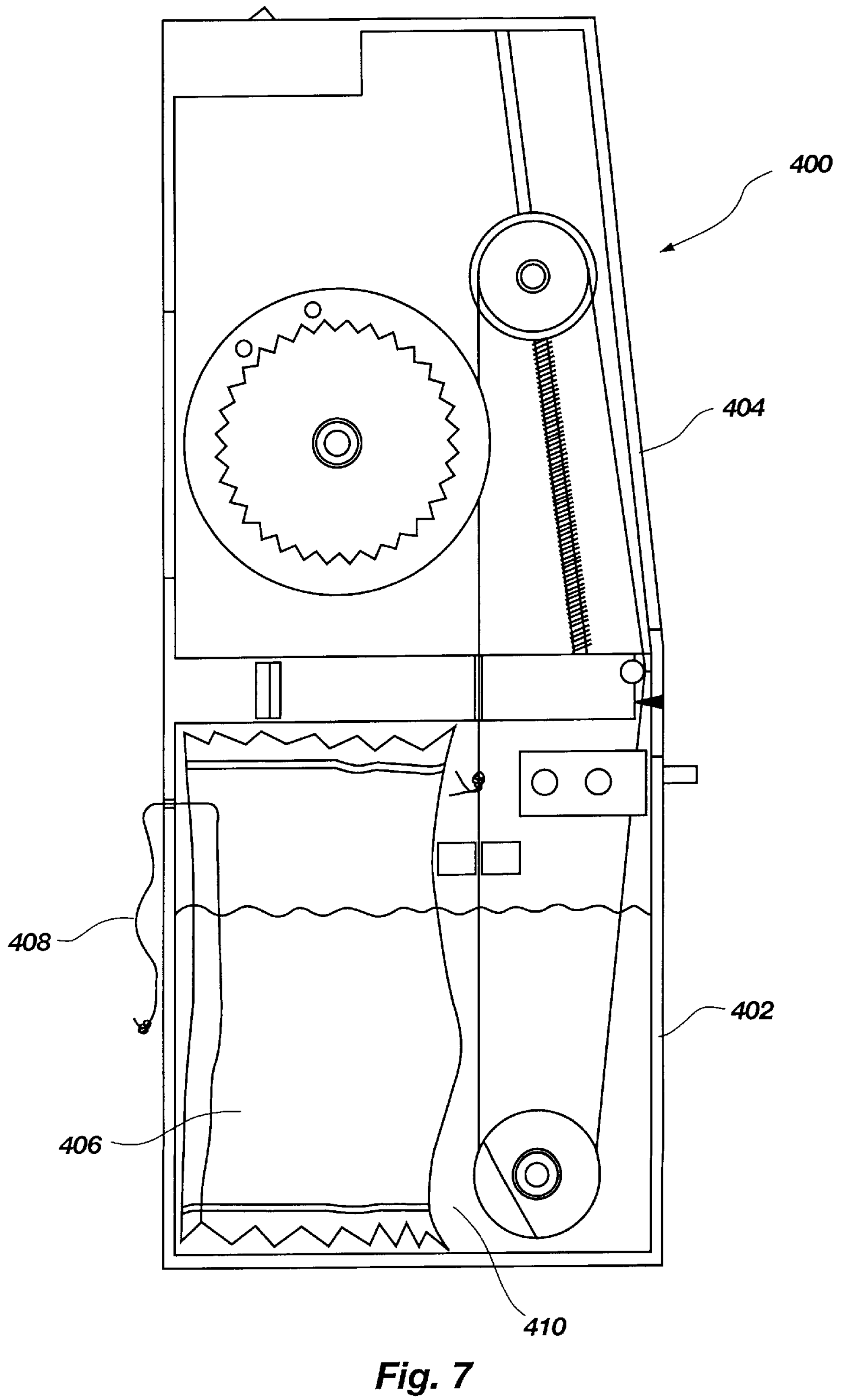
FIG. 7 is a schematic side view of a fourth preferred embodiment of a printer cartridge in accordance with principles of the present invention.

Referring now to FIG. 7, a disposable printer cartridge, generally indicated at 400, is configured similarly to the cartridge 300 illustrated in FIGS. 4, 5, and 6, and includes a painting material reservoir 402 integrally formed with the housing 404. The cartridge 400 is provided with a sealed pouch 406 having painting material in liquid form disposed therein. The sealed pouch 406 is contained within the reservoir 402 and includes a means for opening the pouch 406, in this preferred embodiment, a pull string 408 which upon pulling by a user causes the pouch 406 to rupture allowing the painting material to flow into the reservoir 402. The pouch 406 is preferably comprised of metalized plastic to prevent gas migration through the pouch membrane. In addition, the pouch 406 is preferably bonded to the wall 410 of the reservoir 402 as with an epoxy or other adhesive materials known in the art that will not react with the painting material. Of course, after reviewing the present invention, those skilled in the art will appreciate that other means of providing a self contained painting material supply within the cartridge 400 may be employed with the present invention.

Figure 9:
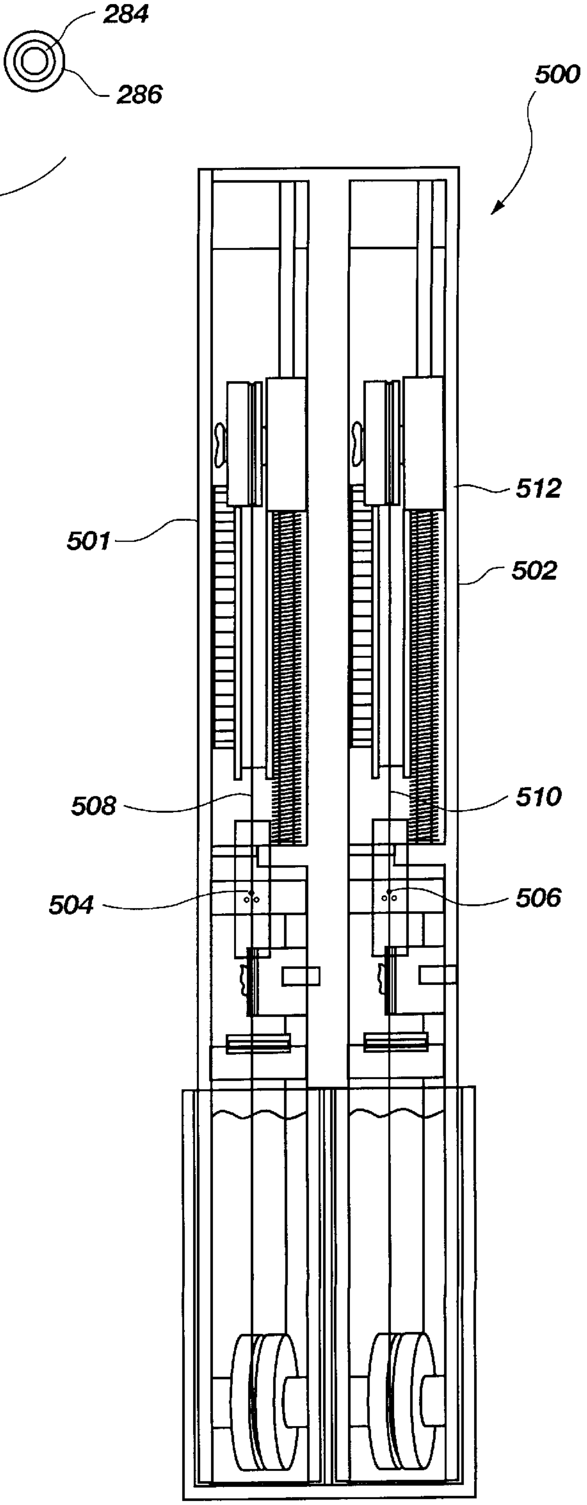
FIG. 9 is a schematic side view of a fifth preferred embodiment of a printer cartridge in accordance with principles of the present invention.

As illustrated in FIG. 9, a plurality of printer cartridges 501 and 502 may be combined to provide a multi-color printer cartridge, generally indicated at 500, in accordance with the present invention. While the cartridges 501 and 502 each include their own nozzle orifices 504 and 506, a single air source coupling, as previously described, may be secured to the housing 512 to provide a source of pressurized air to each of the plurality of nozzle orifices 504 and 506. In use, the distance between the nozzle orifices 504 and 506 or the wires 508 and 510 can be programmed into the printer employing the cartridge 500 such that the printer will know the relative positions of the individual cartridges 501 and 502 relative to the print medium (not shown) in order to dispense the colors at relatively precise locations on the print medium. Of course, those skilled in the art will appreciate after reviewing and understanding the present invention that any number of cartridges 501 and 502 may be combined to provide a printer cartridge 500 capable of printing with any number of colors as desired. Moreover, it may be desirable to provide separate cartridges including one for black only and one for colors only. In such a manner, when prints require a substantial amount of black color to be applied to the print medium, the unused or slightly used color cartridges would not have to be replaced as would be the case if a black cartridge were combined with the color cartridges into a single multi-colored cartridge.

Figure 10:
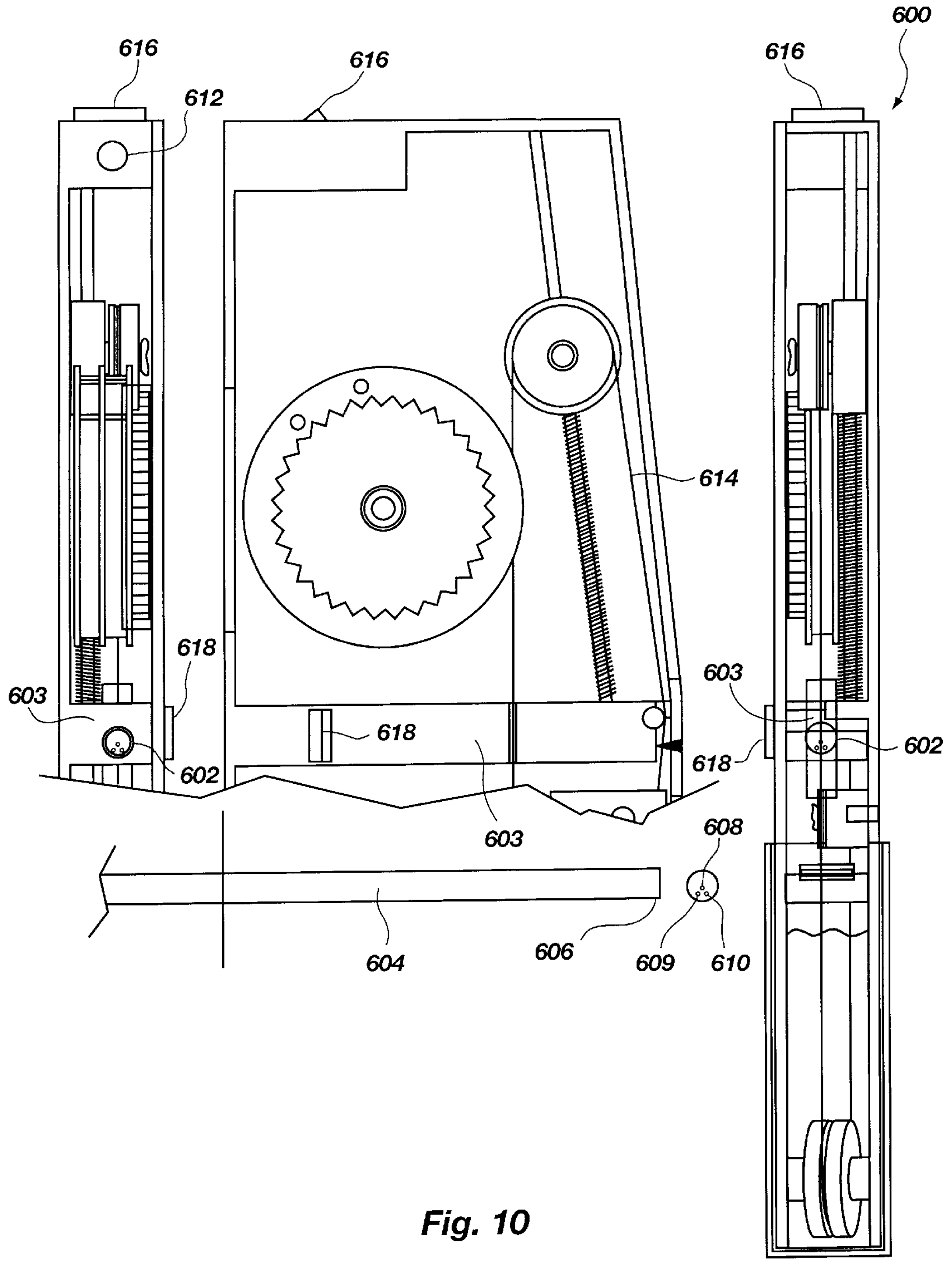
FIG. 10 is a schematic side view of a sixth preferred embodiment of a printer cartridge in accordance with principles of the present invention.

It is also contemplated that various components shown as elements of the printer cartridge 300 illustrated with reference to FIGS. 4, 5, and 6 may be associated with the printer (not shown) rather than components of the cartridge. As shown in FIG. 10, the printer cartridge, generally indicated at 600, configured in a similar manner to the printer cartridge 300 illustrated in FIGS. 4, 5, and 6, is provided with a transversely extending bore or air jet receiving aperture 602 which extends through and is defined by the crossmember 603. An air jet unit 604 comprising an elongate hollow tube may be permanently attached to or selectively removable from the printer. The distal end 606 of the air jet unit 604 defines at least one and preferably three nozzle orifices 608, 609, and 610 configured in a triangular pattern. Thus, when inserting the cartridge 600 into a printer, the alignment feature 612 in addition to insertion of the air jet unit 604 into the bore or aperture 602 properly aligns the nozzle orifices 608, 609, and 610 relative to the wire 614 of the cartridge 600. Likewise, as the snap-in features 616 and 618 lock the cartridge 600 in place, the air jet unit 604 will be fully inserted into the bore 602 such that the nozzle orifices 608, 609, and 610 are positioned at the desired distance from the wire 614 during a printing operation. Those skilled in the art should appreciate after becoming familiarized with the present invention, that various other components of the cartridge 600 could be provided by the printer such that fewer parts are needed for the cartridge 600. Likewise, parts of the printer that tend to wear or become contaminated with painting material during the printing process may be included in the cartridge 600.

Figure 11:
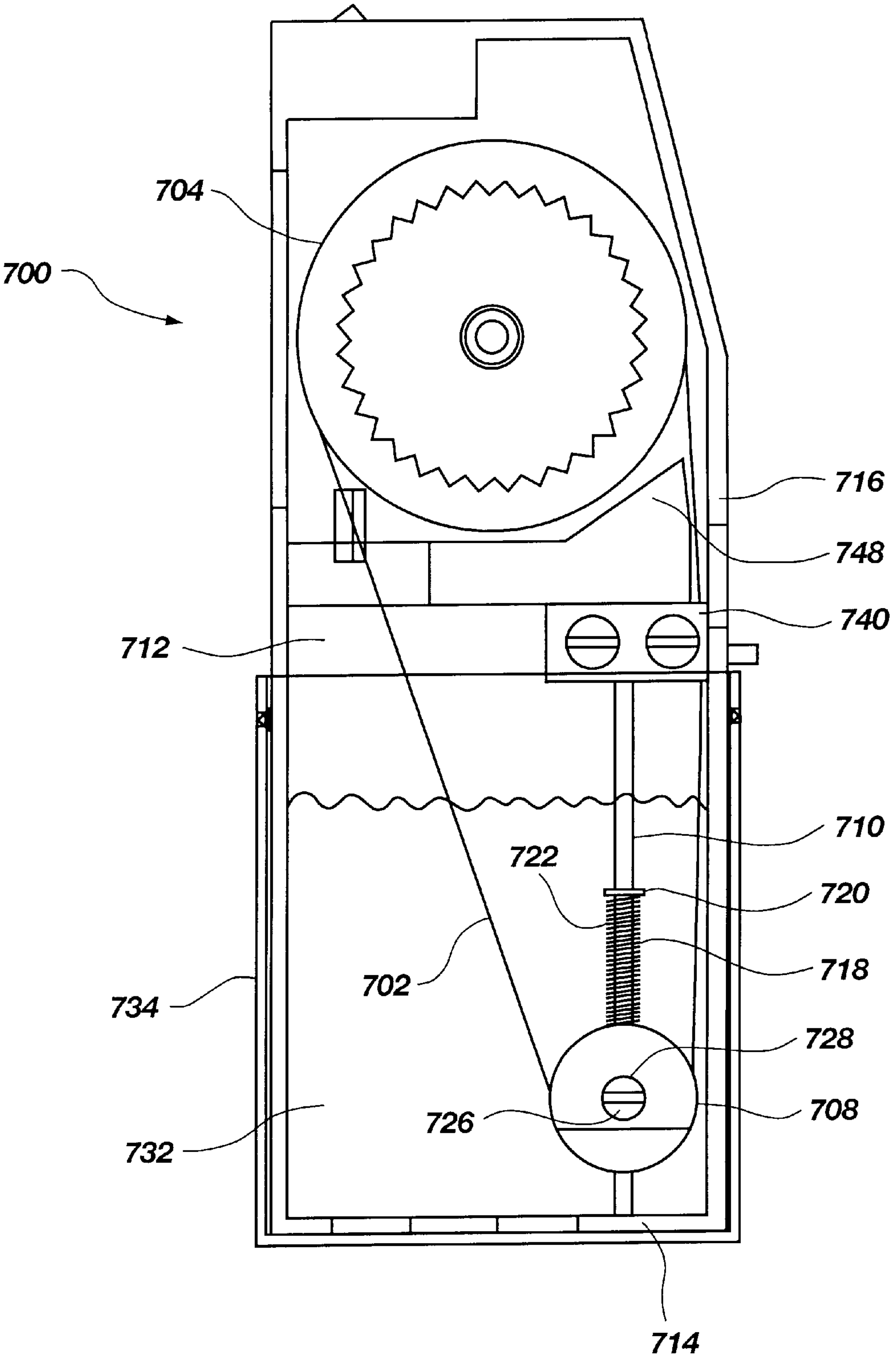
FIG. 11 is a schematic side view of a seventh preferred embodiment of a printer cartridge in accordance with principles of the present invention.
Figure 12:
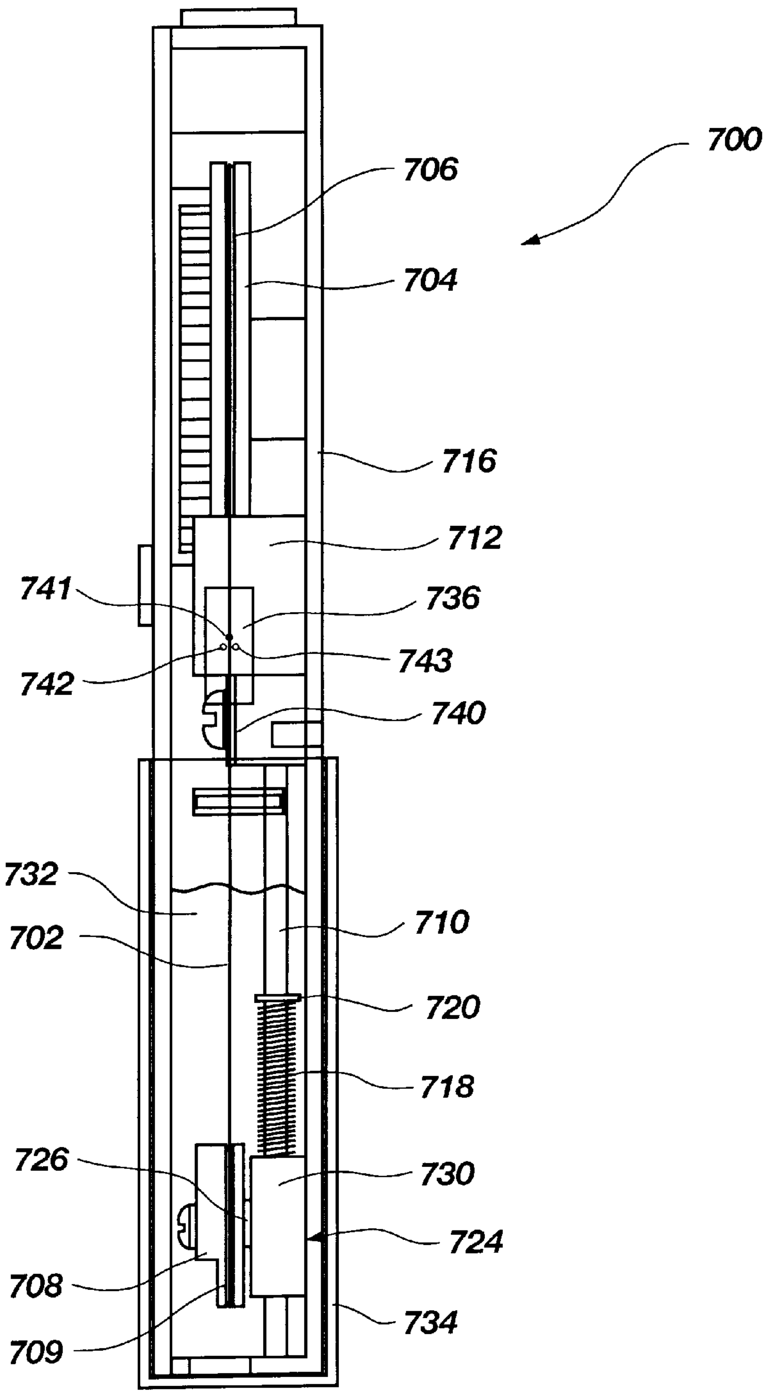
FIG. 12 is a schematic front view of the printer cartridge illustrated in FIG. 11.
Figure 13:
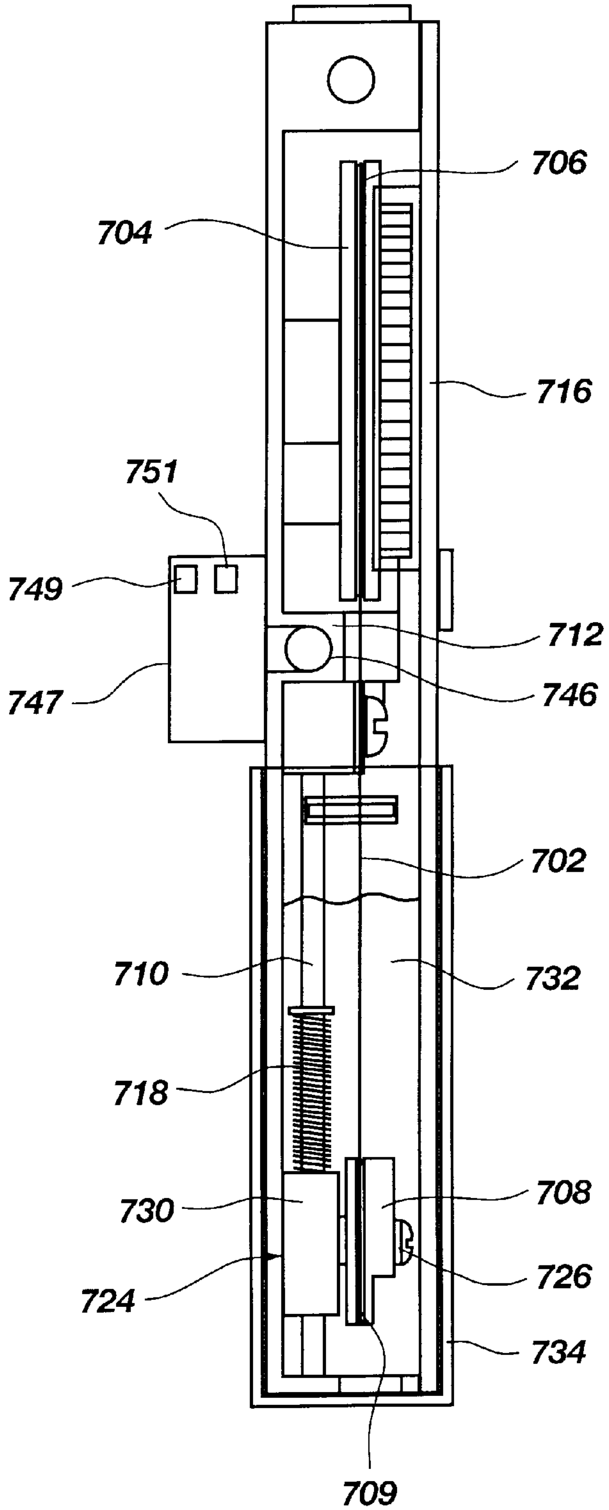
FIG. 13 is a schematic back view of the printer cartridge illustrated in FIG. 11.

Finally, as shown in FIGS. 11, 12, and 13, a printer cartridge, generally indicated at 700, in accordance with the principles of the present invention comprises a wire 702 formed into a continuous loop. Such a wire 702 may be formed by etching sheet stock and/or by drawing. The wire 702 is disposed around the drive wheel 704 within the circumferential groove 706 at least a half turn but may be wrapped one and a half times or more around the wheel 704. In addition, the cartridge 700 includes a lower wire guide or idler 708 mounted in a biasing relationship relative to the wheel 704. As illustrated, the idler 708 is mounted onto an elongate shaft or rod 710 that extends from the crossmember 712 to the bottom end 714 of the cartridge housing 716. As such, the idler 708 can travel along a length of the shaft 710 to maintain relatively uniform tension in the wire 702. The idler 708 is biased relative to the shaft 710 with a biasing member 718, in this example a coil spring disposed about the shaft 710. An abutment member 720 is secured to the shaft 710 to provide an abutment surface for the proximal end 722 of the biasing member 718. The idler 708 is provided with a hub 724 comprising an elongate member 726 for rotatably securing to a bore 728 provided in the idler 708 and a sliding member 730 for receiving therein and sliding along the shaft 710. Allowing such movement of the idler 708 relative to the wheel 704 allows for diameter growth of the circumferential groove 706 as may be the case when paint 732 contained within the paint reservoir 734 is not completely removed from the wire 702 by the air nozzle 736 during the printing process and thus may be deposited within the groove 706. Also, the diameter of the wire 702 itself may actually increase slightly during the printing process as paint 732 coats the wire 702.

In yet another preferred embodiment, the biasing member 718 may not be required such that the idler 708 is substantially rigidly held in position relative to the wheel 704. In such a case, the wire 702 itself may be comprised of an elastic-like material, such as spring steel, nylon, or other materials known in the art, that is essentially self-tensioning. Alternatively, because of the viscosity of the painting material and the interaction of the wire 702 riding within the groove 709, the painting material will tend to build within the circumferential groove 709 during the printing process and thus increase the diameter of the groove 309. As such, the wire 702 may be self-tensioning by allowing more painting material to build within the groove 709 if tension needs to be increased or by cutting into the build up of painting material within the groove 709 if the tension on the wire 709 needs to be decreased.

During the printing process, the scraper 740 maintains the wire 702 in front of the air jet holes or orifices 741, 742 and 743 and scrapes the wire 702 on three sides. That is, the scraper 740 scrapes the wire 702 on two opposing sides and pushes the wire 702 away from the wheel 704 and the idler 708. The spring tension prevents the wire 702 from moving away from the wheel 704 and the idler 708 to any further extent. The scraper 740 could be self-cleaning as by backing up the wire 702 a short distance at the end of each print line or after any number of print lines. Moreover, in the case where the wire 702 may be advanced continuously or otherwise, excess paint 732 may accumulate on the drive wheel 704. While much of the paint 732 may be carried back down into the reservoir 734 by the wire 702 as it pulls the paint 732 off the wheel 704, additional features may be included, such as the wedge 748 provided in the cross-member 712, to direct dripping paint 732 away from the air nozzle 736.

With such a cartridge 700, the rewind scraper and various wire guides provided in other preferred embodiments are eliminated. However, the wire 702 can be advanced as a function of paint 732 to be applied as in other cartridges herein described. It is also contemplated that the cartridge 700 (as well as other preferred embodiments of cartridges provided herein) may employ a wire 702 that is continuously advanced or semicontinuously advanced as during each print line. While printing, the paint 732 is selectively removed from the wire 702 with an air jet that is pulsed or modulated as with pulse width modulation. That is, the amount or frequency of modulation of the air or the length of the air pulse can control the amount of paint applied as the cartridge 700 is moved over or with respect to the media. Modulation can occur with an external valve feeding an air manifold 746 or a modulation device or air valve 747 can be incorporated into the cartridge. The modulation device 747 could consist of a solenoid operated air valve or a piezo electric driven valve. In the case where the air modulation device 747 is contained within or attached to the cartridge 700, the cartridge 700 could have electrical contacts 749 and 751 which mate with an electrical signal source (not shown) when the cartridge 700 is snapped in place. The modulation device 747 could also be incorporated into the pin/guide as described in other preferred embodiments herein.

In general, the invention comprises a cartridge for use with a digitally controlled printing device such as a large format printer which employs a paint material for printing or painting images onto a print medium. It is noted that while reference has been made to paint and painting material in the present application, such terms are intended to encompass inks, dyes, and any other liquid pigmented material that can be deposited on a surface for printing or painting purposes. Moreover, references to the term "wire" in the specification and claims is intended to encompass a cord, strand, thread, string, ribbon, filament, cable, line, band, belt, strap, or any other elongated segment of any type of material whether in a loop or not and whether in a flexible, resilient, stretchable, or more rigid form. In addition, it is to be understood that the abovedescribed embodiments are only illustrative of the application of the principles of the present invention. Numerous modifications and alternatives may be devised by those skilled in the art, including combinations of the various embodiments, without departing from the spirit and scope of the present invention. The appended claims are intended to cover such modifications, alternative arrangements, and combinations.

What is claimed is:

1. A replaceable cartridge for use with a printer for depositing a metered amount of a painting material on a surface, comprising:

a housing;

a painting material reservoir associated with said housing for containing a quantity of a painting material;

a drive wheel rotatably mounted within said housing;

a first idler rotatably mounted relative to said housing for positioning within said painting material reservoir;

a wire tensioning device mounted within said housing; and a wire disposed around said drive wheel for being advanced by said drive wheel, around at least a portion of said first idler, and biased by said wire tensioning device.

2. The cartridge of claim 1, further including an air nozzle associated with said housing directed toward a portion of said wire for removing painting material disposed thereon and depositing said painting material onto said surface.

3. The cartridge of claim 2, wherein said air nozzle comprises a nozzle body defining a plurality of nozzle orifices in an end thereof.

4. The cartridge of claim 3, wherein said plurality of nozzle orifices comprises a first nozzle orifice positioned to direct an air jet proximate a left side of said wire, a second nozzle orifice positioned to direct an air jet proximate a right side of said wire, and a third nozzle orifice positioned to direct an air jet proximate the center of said wire.

5. The cartridge of claim 4, wherein said third nozzle orifice is positioned above said first and second nozzle orifices.

6. The cartridge of claim 4, wherein said first, second, and third nozzle orifices are downwardly angled.

7. The cartridge of claim 2, wherein said housing defines a first opening for exposing said air nozzle and a second opening for providing access to said drive wheel for engagement with an external drive mechanism.

8. The cartridge of claim 1, wherein said painting material reservoir is integrally formed with said housing.

9. The cartridge of claim 1, wherein said painting material reservoir is engageable with and removable from said housing.

10. The cartridge of claim 1, wherein said first idler further includes a paddle associated therewith for stirring said painting material.

11. The cartridge of claim 1, wherein said drive wheel defines a first circumferential groove and a second circumferential groove and said wire has a first end and a second end, said first end of said wire being secured to said drive wheel within said first groove and said second end of said wire being secured to said drive wheel within said second groove.

12. The cartridge of claim 11, wherein said first idler is oriented to receive said wire from said first groove such that said wire is substantially aligned with a plane defined by said first groove and to direct said wire toward said second idler such that said wire is substantially aligned with a plane defining said second groove.

13. The cartridge of claim 1, wherein said wire tensioning device comprises a second idler biasly mounted relative to said housing.

14. The cartridge of claim 13, further including a guide disposed within said housing for receiving said second idler and a biasing member disposed between said idler and said housing such that said second idler can translate along said guide to maintain tension in said wire.

15. The cartridge of claim 13, further including an elongate arm rotatably attached to said housing, said second idler being disposed on said arm, and said arm being biased relative to said housing such that said second idler maintains tension in said wire.

16. The cartridge of claim 1, wherein said wire forms a continuous loop.

17. The cartridge of claim 1, further including a painting material filled pouch within said painting material reservoir, said pouch including means for selectively opening said pouch.

18. The cartridge of claim 17, wherein said means for selectively opening said pouch comprises a pull string secured at one end to said pouch for tearing an opening in said pouch.

19. The cartridge of claim 1, further including at least one scraper member in contact with at least a portion of said wire for removing at least some of said painting material from said wire.

20. The cartridge of claim 2, further including a first wire guide for maintaining said wire in position relative to said air nozzle.

21. The cartridge of claim 1, further including alignment features configured for removably securing said housing to a printer.

22. The cartridge of claim 1, wherein said drive wheel includes at least one gear associated therewith for selectively rotating said wheel.

23. The cartridge of claim 1, further including a fluid source coupling secured to said housing for receiving and sealing with a fluid supply.

24. The cartridge of claim 2, further including a device associated with said housing for modulating an air jet flowing from said air nozzle.

25. The cartridge of claim 2, wherein said wire has an amount of painting material disposed thereon, said painting material being removed by said air nozzle by advancing said wire with said drive wheel.

26. An apparatus for use with a printer for depositing a metered amount of a painting material on a surface, comprising:

- a housing;
- a plurality of drive wheels rotatably mounted within said housing;
- a plurality of wires, each being disposed around one of said plurality of drive wheels for being advanced by said one drive wheel;
- a plurality of first idlers rotatably mounted relative to said housing, each for receiving at least a portion of one of said plurality of wires and for directing said one of said plurality of wires into a painting material reservoir.

27. The apparatus of claim 26, further including a plurality of painting material reservoirs associated with said housing, each for containing a quantity of a desired color of a painting material.

28. The apparatus of claim 26, further including a plurality of second idlers rotatably mounted within said housing, each being associated with one of said plurality of drive wheels, said plurality of wires each being disposed around one of said plurality of drive wheels and one of said plurality of first idlers.

29. The apparatus of claim 26, further including a plurality of fluid nozzles, each positioned to direct at least one jet of fluid toward at least a portion of one of said plurality of wires for removing painting material disposed thereon and depositing said painting material onto a surface.

30. The apparatus of claim 29, further including an fluid source coupling secured to said housing for receiving and sealing with a fluid supply and providing fluid from said fluid supply to said plurality of fluid nozzles.

31. The apparatus of claim 29, wherein said plurality of nozzles each define a plurality of nozzle orifices having a first nozzle orifice positioned to direct a fluid jet proximate a left side of said wire, a second nozzle orifice positioned to direct a fluid jet proximate a right side of said wire, and a third nozzle orifice positioned to direct a fluid jet proximate the center of said wire.

32. The apparatus of claim 31, wherein said housing defines at least one first opening for exposing said plurality of orifices and at least one second opening for providing access to said plurality of drive wheels for engagement with at least one external drive mechanism.

33. The apparatus of claim 27, wherein said plurality of painting material reservoirs are integrally formed with said housing.

34. The apparatus of claim 27, wherein each of said painting material reservoirs is engageable with and removable from said housing.

35. A replaceable cartridge for use with a printer for depositing a metered amount of a painting material on a surface, comprising:

- a support structure;
- a drive wheel associated with said support structure;
- a first wire guide mounted relative to said support structure; and
- a wire disposed around at least a portion of said drive wheel and at least a portion of said wire guide for being advanced by said drive wheel through a fluid stream.

36. The cartridge of claim 35, further including a painting material reservoir associated with said support structure for containing a quantity of a painting material.

37. The cartridge of claim 35, wherein said first wire guide is positioned within said painting material reservoir, said wire being in contact with at least a portion of said first wire guide.

38. The cartridge of claim 35, further including a second wire guide for positioning said wire relative to said fluid stream.

39. The cartridge of claim 35, further including a wire tensioning device for maintaining tension in said wire.

40. The cartridge of claim 35, wherein said support structure comprises a housing.

41. The cartridge of claim 39, wherein said first wire guide comprises a first substantially freely rotatable idler having a first circumferential groove defined therein for receiving said wire.

42. The cartridge of claim 41, wherein said wire tensioning device comprises a second substantially freely rotatable idler having a second circumferential groove defined therein for receiving said wire and further including a biasing device associated therewith for biasing said second idler relative to said support structure.

43. The cartridge of claim 39, wherein said wire tensioning device comprises a biasing member associated with said first wire guide for biasing said first wire guide relative to said drive wheel.

44. The cartridge of claim 42, wherein said drive wheel defines a third circumferential groove and a fourth circumferential groove and said wire has a first end and a second end, said first end of said wire being secured to said drive wheel relative to said first groove and said second end of said wire being secured to said drive wheel relative to said second groove.

45. The cartridge of claim 35, wherein said wire forms a continuous loop.

46. The cartridge of claim 35, further including a device associated with said support structure for modulating said fluid stream.

47. The cartridge of claim 35, wherein said wire has an amount of painting material disposed thereon, said painting material being removed by said fluid stream by advancing said wire with said drive wheel.

48. The cartridge of claim 35, further including a motor associated with said drive wheel for selectively controlling rotation of said drive wheel.

* * * * *